US012562463B2

(12) United States Patent

Zheng et al.

(10) Patent No.: US 12,562,463 B2

(45) Date of Patent: Feb. 24, 2026

(54) HIGH-FREQUENCY RADIATION UNIT AND MULTI-FREQUENCY BASE STATION ANTENNA

(71) Applicants: COMBA TELECOM TECHNOLOGY (GUANGZHOU) LTD., Guangzhou (CN); COMBA RF TECHNOLOGY (GUANGZHOU) LTD, Guangzhou (CN)

(72) Inventors: Zhilun Zheng, Guangzhou (CN); Mingchao Li, Guangzhou (CN); Zhanjun Lai, Guangzhou (CN); Zhixiang Li, Guangzhou (CN); Weishao Li, Guangzhou (CN); Jiaju Liang, Guangzhou (CN)

(73) Assignees: COMBA TELECOM TECHNOLOGY (GUANGZHOU) LTD., Guangzhou (CN); COMBA RF TECHNOLOGY (GUANGZHOU) LTD, Guangzhou (CN)

( * ) Notice: Subject to any disclaimer, the term of this patent is extended or adjusted under 35 U.S.C. 154(b) by 61 days.

(21) Appl. No.: 18/691,978

(22) PCT Filed: Mar. 18, 2022

(86) PCT No.: PCT/CN2022/081832

§ 371 (c)(1),
(2) Date: Mar. 14, 2024

(87) PCT Pub. No.: WO2023/045282

PCT Pub. Date: Mar. 30, 2023

(65) Prior Publication Data

US 2024/0380100 A1 Nov. 14, 2024

(30) Foreign Application Priority Data

Sep. 24, 2021 (CN) .......................... 202111124060.0

(51) Int. Cl.
*H01Q 1/24* (2006.01)
*H01Q 1/50* (2006.01)
(Continued)

(52) U.S. Cl.
CPC ............... *H01Q 1/246* (2013.01); *H01Q 1/50* (2013.01); *H01Q 9/16* (2013.01); *H01Q 19/104* (2013.01);
(Continued)

(58) Field of Classification Search
CPC ............ H01Q 1/12; H01Q 1/246; H01Q 1/36; H01Q 1/50; H01Q 1/521; H01Q 5/378;
(Continued)

(56) References Cited

U.S. PATENT DOCUMENTS

| | | | |
|---|---|---|---|
| 12,381,325 B2 * | 8/2025 | Sundararajan ........... | H01Q 5/42 |
| 2014/0240188 A1 | 8/2014 | Mamo et al. | |

(Continued)

FOREIGN PATENT DOCUMENTS

| | | |
|---|---|---|
| CN | 102110875 A | 6/2011 |
| CN | 203232955 U | 10/2013 |

(Continued)

OTHER PUBLICATIONS

International Search Report and Written Opinion for International Application No. PCT/CN2022/081832 mailed May 25, 2022.

(Continued)

*Primary Examiner* — Raymond R Chai

(74) *Attorney, Agent, or Firm* — Ballard Spahr LLP

(57) ABSTRACT

The present invention relates to a high-frequency radiation unit and a multi-frequency base station antenna. The high-frequency radiation unit comprises a radiator, a vibrator base, a first feeding member and a second feeding member. The distance between a first vertical section and a center line is greater than the distance between a first balun and the (Continued)

center line, and the distance between a second vertical section and the center line is greater than the distance between a second balun and the center line, that is, the first vertical section is disposed on one side of the first balun away from the center line, and the second vertical section is disposed on one side of the second balun away from the center line.

11 Claims, 11 Drawing Sheets

(51) Int. Cl.

| | |
|---|---|
| ***H01Q 9/16*** | (2006.01) |
| ***H01Q 19/10*** | (2006.01) |
| ***H01Q 21/00*** | (2006.01) |
| ***H01Q 21/30*** | (2006.01) |

(52) U.S. Cl.
CPC ......... *H01Q 21/0006* (2013.01); *H01Q 21/30* (2013.01)

(58) Field of Classification Search
CPC ........ H01Q 5/42; H01Q 9/16; H01Q 15/0053; H01Q 19/10; H01Q 19/104; H01Q 19/108; H01Q 21/0006; H01Q 21/062; H01Q 21/26; H01Q 21/30; Y02D 30/70
See application file for complete search history.

(56) References Cited

U.S. PATENT DOCUMENTS

| | | | | |
|---|---|---|---|---|
| 2015/0200460 | A1 | 7/2015 | Isom et al. | |
| 2019/0140364 | A1 | 5/2019 | Mirmozafari et al. | |
| 2021/0098864 | A1 | 4/2021 | Zhang | |
| 2023/0387607 | A1 * | 11/2023 | Le | H01Q 21/26 |
| 2024/0258715 | A1 * | 8/2024 | Sundararajan | H01Q 21/26 |
| 2024/0266758 | A1 * | 8/2024 | Sundararajan | H01Q 21/26 |
| 2024/0313402 | A1 * | 9/2024 | Sundararajan | H01Q 21/062 |

FOREIGN PATENT DOCUMENTS

| | | | | | |
|---|---|---|---|---|---|
| CN | 205846220 | U | | 12/2016 | |
| CN | 206893796 | U | | 1/2018 | |
| CN | 108336486 | A | | 7/2018 | |
| CN | 207624897 | U | | 7/2018 | |
| CN | 109037919 | A | | 12/2018 | |
| CN | 208315769 | U | | 1/2019 | |
| CN | 109326872 | A | | 2/2019 | |
| CN | 110011034 | A | | 7/2019 | |
| CN | 110931951 | A | * | 3/2020 | H01Q 1/50 |
| CN | 211980862 | U | * | 11/2020 | |
| CN | 112216972 | A | * | 1/2021 | H01Q 1/38 |
| CN | 112490642 | A | * | 3/2021 | H01Q 1/50 |
| CN | 113871856 | A | | 12/2021 | |

OTHER PUBLICATIONS

Extended European Search Report for European Application No. 22871347.5 mailed Dec. 20, 2024.

* cited by examiner

HIGH-FREQUENCY RADIATION UNIT AND MULTI-FREQUENCY BASE STATION ANTENNA

CROSS-REFERENCE TO RELATED APPLICATIONS

This application is an U.S. national phase application under 35 U.S.C. § 371 based upon international patent application No. PCT/CN2022/081832, filed on Mar. 18, 2022, which itself claims priority to Chinese patent application No. 202111124060.0 filed on Sep. 24, 2021. The contents of the above-identified applications are hereby incorporated herein in their entireties by reference.

TECHNICAL FIELD

The present disclosure relates to the technical field of antenna communication, and in particular to a high-frequency radiating unit and a multi-frequency base station antenna.

BACKGROUND

With the rapid development of mobile communication technology, under the current multi-network coexistence environment, the number of base station antennas needs to be doubled, and problems such as difficult site selection and inconvenient installation of base station antennas appear day by day. In order to save site and antenna resources, multi-frequency shared antenna has become the mainstream of current base station antenna, and is rapidly evolving in the direction of more frequency bands and narrower antenna cross-section.

However, on the premise that the number of frequency bands of the antenna is increasing day by day, in order to ensure that the cross-sectional size of the antenna is unchanged or even narrower, the array arrangement of different frequency bands will be more compact, and the mutual coupling problem is especially prominent. For example, a low-frequency radiating unit generates a certain excitation signal to its adjacent high-frequency radiating unit, so as to generate parasitic radiation, which causes the deformity of the low-frequency pattern and causes the radiation performance of the low-frequency to be sharply reduced. In high frequency, due to the more compact array arrangement, the mutual coupling between adjacent arrays is enlarged, and the horizontal beam width is widened, resulting in a decrease in gain.

SUMMARY

Based on this, it is necessary to overcome the disadvantages of the prior art, and provide a high-frequency radiating unit and a multi-frequency base station antenna, which can realize miniaturization, wide frequency band, and high gain.

The technical solution is as follows: a high-frequency radiating unit includes: a radiator including a first dipole and a second dipole that are arranged orthogonally, the first dipole including two first radiating plates, and the second dipole including two second radiating plates; an oscillator base including a connecting portion, two first baluns, and two second baluns, wherein bottom ends of the two first baluns and the two second baluns are connected to the connecting portion, top ends of the two first baluns are connected to the two first radiating plates in one-to-one correspondence, top ends of the two second baluns are connected to the two second radiating plates in one-to-one correspondence, and a straight line passing through a center of the connecting portion and perpendicular to a surface of the radiating plate is defined as a center line; a first feeder and a second feeder that are arranged orthogonally. The a first feeder is electrically connected to the first dipole, the second feeder is electrically connected to the second dipole, the first feeder includes a first vertical section arranged at the periphery of the oscillator base, a distance between the first vertical section and the center line is greater than a distance between the first balun and the center line, the second feeder includes a second vertical section arranged at the periphery of the oscillator base, and a distance between the second vertical section and the center line is greater than a distance between the second balun and the center line.

According to the high-frequency radiating unit, since the distance between the first vertical section and the center line O is greater than the distance between the first balun and the center line O, and the distance between the second vertical section and the center line O is greater than the distance between the second balun and the center line O, that is, the first vertical section is arranged on a side of the first balun away from the center line O, and the second vertical section is arranged on a side of the second balun away from the center line O. Such configuration is different from the prior art that the first vertical section and the second vertical section are arranged in internal wiring grooves of the first balun and the second balun, so that it is not necessary to provide a closed balun structure as in the prior art, but it can provide as an opened balun structure, which can reduce the structural size of the oscillator base to a certain extent, thus achieving the miniaturization of the oscillator base. Meanwhile, the high-frequency parasitic radiation of the balun can be reduced, and the gain of the high-frequency radiating unit can be effectively improved.

In one of the embodiments, the first feeder further includes a first transverse section, an end of the first transverse section is connected to the first vertical section, the top end of each of the two first baluns is provided with a first groove corresponding to the first transverse section, the first transverse section is provided in the first groove, an insulating spacer is provided between the first transverse section and an inner wall of the first groove, the second feeder further includes a second transverse section, an end of the second transverse section is connected to the second vertical section, the top end of each of the two second baluns is provided with a second groove corresponding to the second transverse section, the second transverse section is provided in the second groove, and an insulating spacer is provided between the second transverse section and an inner wall of the second groove.

In one of the embodiments, the first feeder further includes a third vertical section connected to another end of the first transverse section, the third vertical section is provided at the periphery of the oscillator base, a distance between the third vertical section and the center line is greater than the distance between the first balun and the center line, the second feeder further includes a fourth vertical section connected to another end of the second transverse section, the fourth vertical section is provided at the periphery of the oscillator base, and a distance between the fourth vertical section and the center line is greater than the distance between the second balun and the center line.

In one of the embodiments, the oscillator base further includes a first sleeve and a second sleeve that are connected to the connecting portion, the first sleeve is provided corresponding to the first vertical section, the first vertical section extends through the first sleeve, the first vertical section and the first sleeve are configured to be connected to an inner conductor and an outer conductor of one coaxial line, respectively, the second sleeve is provided corresponding to the second vertical section, the second vertical section extends through the second sleeve, and the second vertical section and the second sleeve are configured to be connected to an inner conductor and an outer conductor of another coaxial line, respectively.

In one of the embodiments, a portion of the connecting portion facing the first sleeve is provided with a first concave surface, the first sleeve is fixed on the first concave surface, a portion of the connecting portion facing the second sleeve is provided with a second concave surface, and the second sleeve is fixed on the second concave surface.

In one of the embodiments, the first vertical section is configured to be electrically connected to a transmission line for transmitting signals in one of the polarization directions, and the second vertical section is configured to be electrically connected to a transmission line for transmitting signals in another polarization direction.

In one of the embodiments, the first radiating plate is a first frame, the first frame is a closed frame, or the first frame is provided with a first notch at a portion away from the first balun; the second radiating plate is a second frame, the second frame is a closed frame, or the second frame is provided with a second notch at a portion away from the second balun.

In one of the embodiments, the high-frequency radiating unit further includes a coupling metal plate provided above the radiator at an interval, a surface of the coupling metal plate is provided with a hollow-out opening, and the hollow-out opening is shaped as "+" or "*".

In one of the embodiments, the coupling metal plate is a square plate, a length of diagonal line of the hollow-out opening is defined as m, m is 0.25 to 0.4 times of a wavelength of a center operating frequency, a length of any side of the coupling metal plate is defined as n, and n is 0.35 to 0.55 times of the wavelength of the center operating frequency.

In one of the embodiments, aperture sizes of the first dipole and the second dipole are defined as L, L is 0.2 to 0.35 times of the wavelength of the center operating frequency, a distance from a surface of the radiator to a bottom surface of the connecting portion is defined as H, and H is 0.14 to 0.2 times of the wavelength of the center operating frequency.

A multi-frequency base station antenna includes at least one high-frequency radiating unit, a reflecting plate, and at least one low-frequency radiating unit, and both the high-frequency radiating unit and the low-frequency radiating unit are provided on the reflecting plate.

According to the multi-frequency base station antenna, since the distance between the first vertical section and the center line O is greater than the distance between the first balun and the center line O, and the distance between the second vertical section and the center line O is greater than the distance between the second balun and the center line O, that is, the first vertical section is arranged on a side of the first balun away from the center line O, and the second vertical section is arranged on a side of the second balun away from the center line O. In this way, instead of respectively arranging the first vertical section and the second vertical section internal wiring grooves of the first balun and the second balun as in the conventional technology, so that it is not necessary to provide a closed balun structure as in the conventional technology, but can provide as an open balun structure, so that the structural size of the oscillator base can be reduced to a certain extent, that is, the miniaturization of the oscillator base can be realized, the high-frequency parasitic radiation of the balun can be reduced, and the gain of the high-frequency radiating unit can be effectively improved. Further, the coupling metal plate spaced above the radiator can effectively reduce a height and an aperture size of the radiator while realizing the wideband impedance matching of the high-frequency radiating unit, thereby reducing the low-frequency parasitic radiation of the radiator. In addition, the coupling between the coupling metal plate and the radiator has a high-pass filtering characteristic, which can effectively suppress a coupling signal of the low-frequency radiating unit, thereby reducing the low-frequency parasitic radiation of the high-frequency radiating unit, and effectively improving the low-frequency antenna gain in the multi-frequency base station antenna.

BRIEF DESCRIPTION OF THE DRAWINGS

The drawings constitute a part of the present disclosure and are used to provide a further understanding of the present disclosure. The exemplary embodiments of the present disclosure and their descriptions are used to explain the present disclosure and do not constitute an improper limitation of the present disclosure.

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

100. High-frequency radiating unit; 110. Radiator; 111. First radiating plate; 1111. First notch; 1112. First hollow area; 112. Second radiating plate; 1121. Second notch; 1122. Second hollow area; 120. Oscillator base; 121. Connecting portion; 1211. First concave surface; 1212, Second concave surface; 122, First balun; 1221, First groove; 123, Second balun; 1231, Second groove; 124, First sleeve; 125, Second sleeve; 130, First feeder; 131, First vertical section; 132, First transverse section; 133, Third vertical section; 140, Second feed; 141, Second vertical section; 142, Second transverse section; 150, Coupling metal plate; 151, Hollow-out opening; 200, Low-frequency radiating unit; O, Center line.

DETAILED DESCRIPTION OF THE EMBODIMENTS

In order to make the above objects, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

Figure 1:
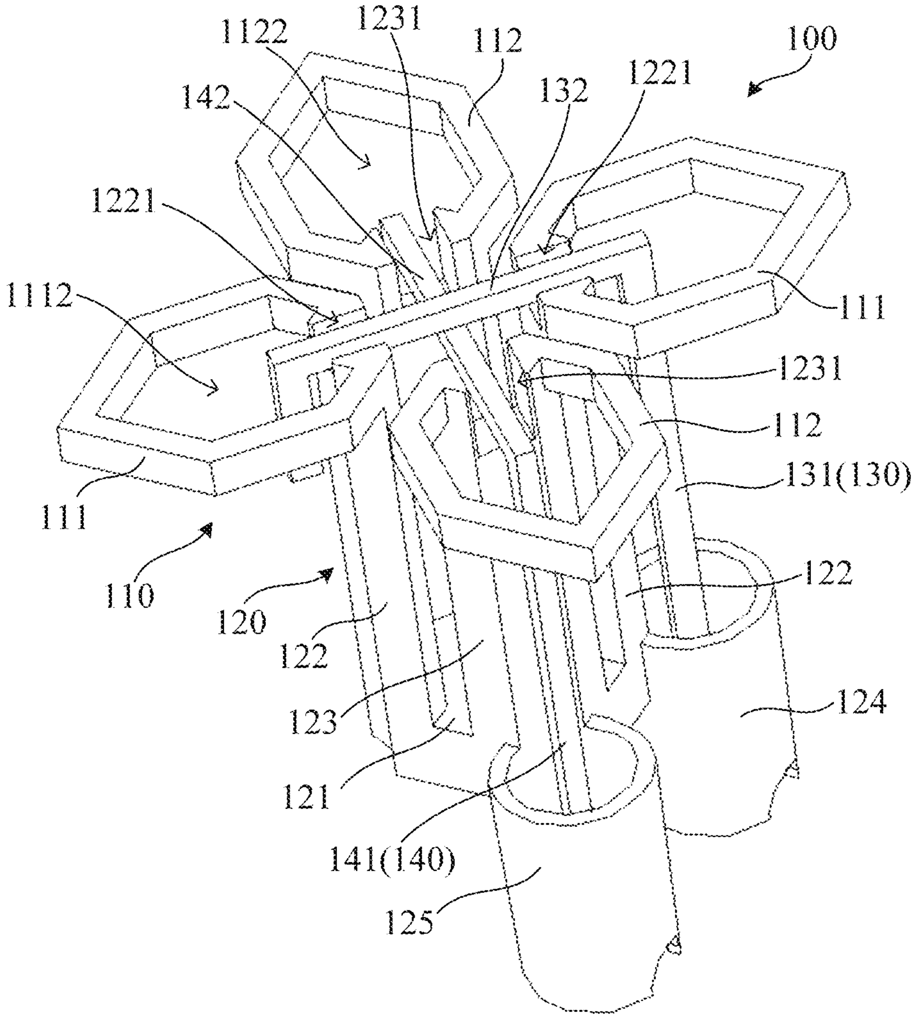
FIG. 1 is a perspective view of a high-frequency radiating unit according to an embodiment of the present disclosure.
Figure 2:
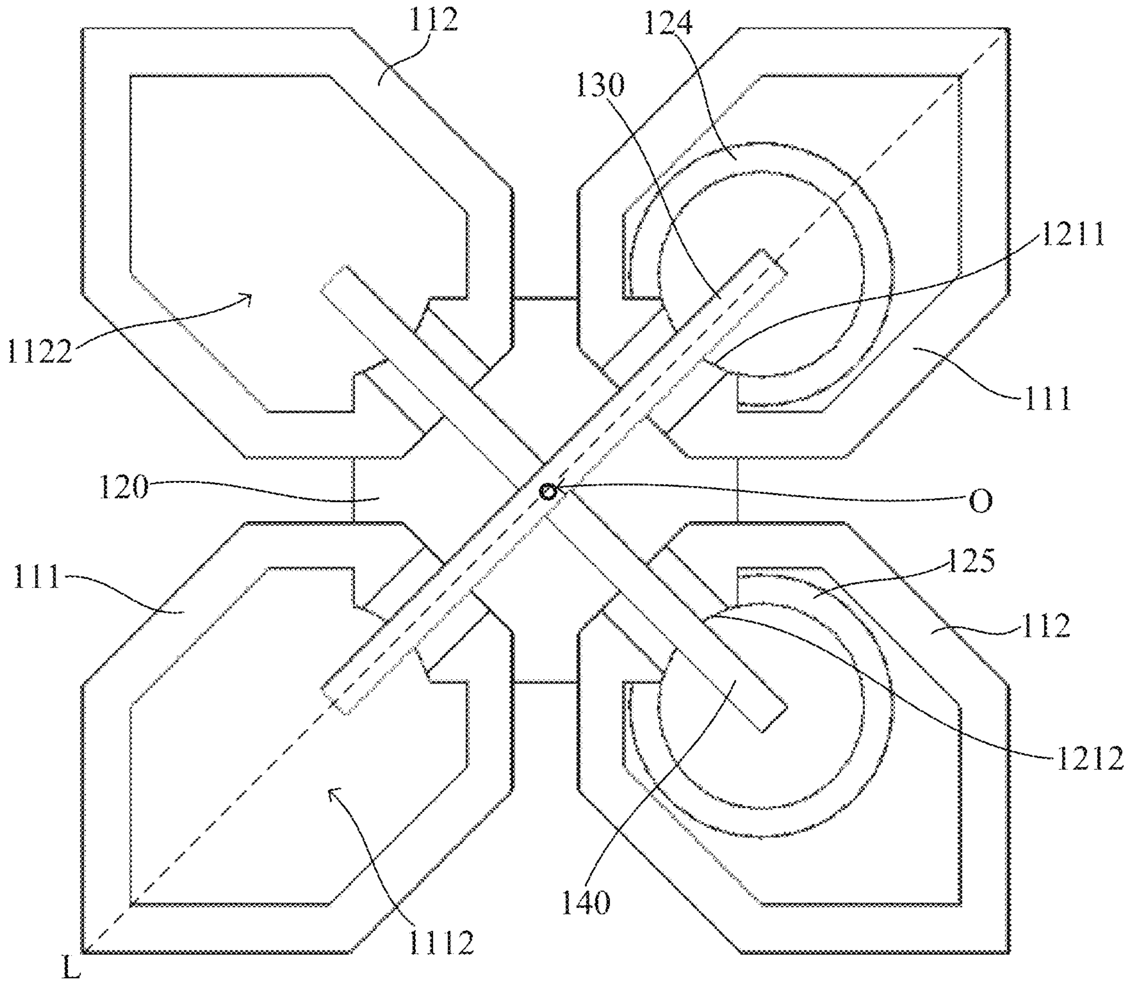
FIG. 2 is a top view of the high-frequency radiating unit shown in FIG. 1.
Figure 3:
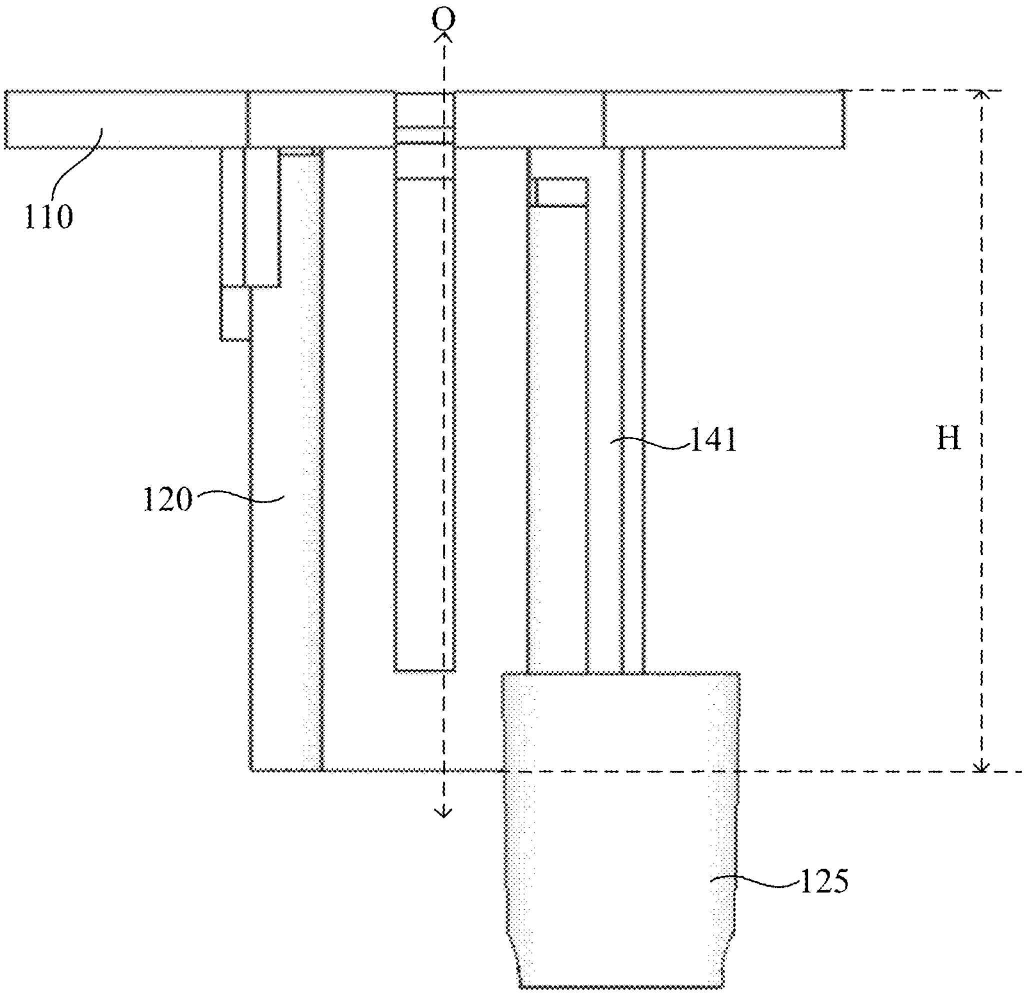
FIG. 3 is a front view of the high-frequency radiating unit shown in FIG. 1.
Figure 4:
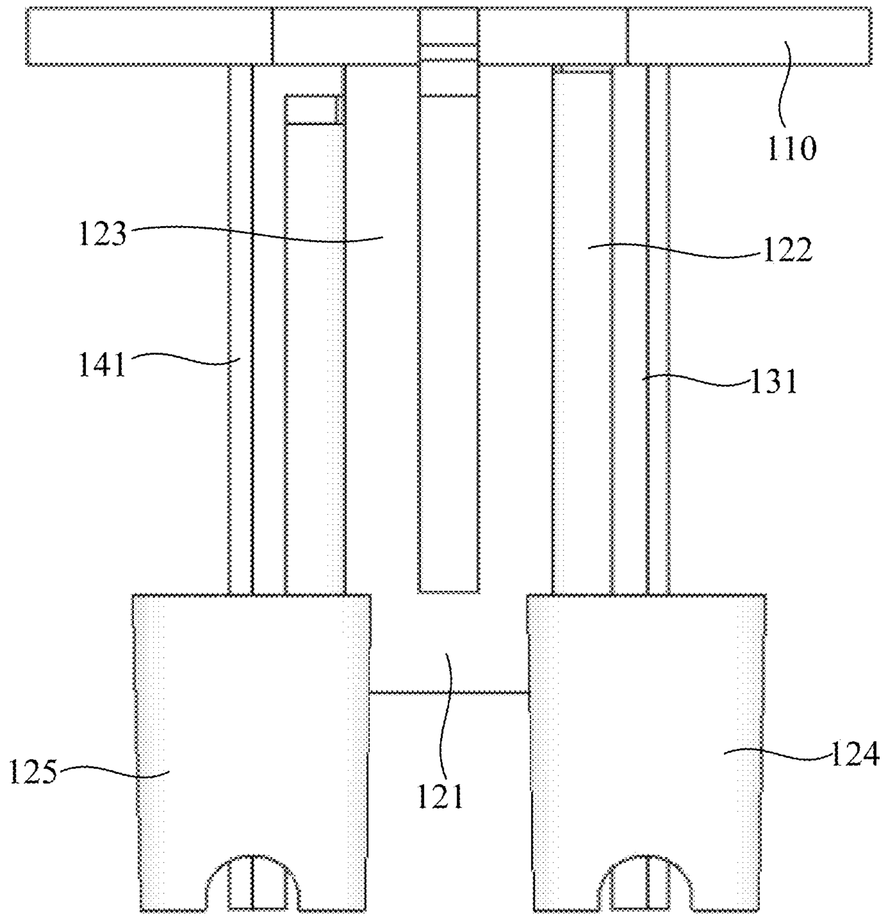
FIG. 4 is a side view of the high-frequency radiating unit shown in FIG. 1.

Referring to FIGS. 1 to 4, FIG. 1 is a perspective view of a high-frequency radiating unit 100 according to an embodiment of the present disclosure, FIG. 2 is a top view of the high-frequency radiating unit 100 shown in FIG. 1, FIG. 3 is a front view of the high-frequency radiating unit 100 shown in FIG. 1, and FIG. 4 is a side view of the high-frequency radiating unit 100 shown in FIG. 1. A high-frequency radiating unit 100 is provided according to an embodiment of the present disclosure, including a radiation body 110, an oscillator base 120, a first feeder 130, and a second feeder 140. The radiation body 110 includes a first dipole (not labeled) and a second dipole (not labeled) that are arranged orthogonally. The first dipole includes two first radiating plates 111, and the second dipole includes two second radiating plates 112. The oscillator base 120 includes a connecting portion 121, two first baluns 122, and two second baluns 123. Bottom ends of the two first baluns 122 and the two second baluns 123 are connected to the connecting portion 121, top ends of the two first baluns 122 are connected to the two first radiating plates 111 in one-to-one correspondence, and top ends of the two second baluns 123 are connected to the two second radiating plates 112 in one-to-one correspondence. A straight line passing through a center of the connecting portion 121 and perpendicular to a surface of the radiating plate is defined as a center line O (not labeled). The first feeder 130 is orthogonal to the second feeder 140 and is electrically connected to the first dipole (specifically, the electrical connection mode includes a coupled connection mode and a direct connection mode). The second feeder 140 is electrically connected to the second dipole (specifically, the electrical connection mode includes a coupled connection mode and a direct connection mode). The first feeder 130 includes a first vertical section 131 provided at a periphery of the oscillator base. Specifically, the first vertical section 131 is spaced from one of the first baluns 122, and a distance between the first vertical section 131 and the center line O is greater than a distance between the first balun 122 and the center line O. The second feeder 140 includes a second vertical section 141 provided at the periphery of the oscillator base. Specifically, the second vertical section 141 is spaced apart from one of the second baluns 123, and a distance between the second vertical section 141 and the center line O is greater than a distance between the second balun 123 and the center line O.

According to the aforementioned high-frequency radiating unit 100, since the distance between the first vertical section 131 and the center line O is greater than the distance between the first balun 122 and the center line O, and the distance between the second vertical section 141 and the center line O is greater than the distance between the second balun 123 and the center line O, that is, the first vertical section 131 is arranged on a side of the first balun 122 away from the center line O, and the second vertical section 141 is arranged on a side of the second balun 123 away from the center line O. Such configuration is different from the prior art that the first vertical section 131 and the second vertical section 141 are arranged in internal wiring grooves of the first balun 122 and the second balun 123, so that it is not necessary to provide a closed balun structure as in the prior art, but it can provide as an opened balun structure, which can reduce the structural size of the oscillator base 120 to a certain extent, thus achieving the miniaturization of the oscillator base 120. Meanwhile, the high-frequency parasitic radiation of the balun can be reduced, and the gain of the high-frequency radiating unit 100 can be effectively improved.

It should be noted that the electrical connection in this embodiment may be realized by coupling connection, or may be realized by mutual electrical contact, which is not limited herein and can be set according to actual requirements.

It should be noted that the connecting portion 121 is generally designed as, for example, a circular plate, a square plate, a hexagonal plate, an octagonal plate, etc. Correspondingly, a center of the circular plate is used as a center of the connecting portion 121, and an intersection point of diagonal lines of the square plate, the hexagonal plate, or the octagonal plate is used as the center of the connecting portion 121. The connecting portion 121 may be of an irregular structure, and a geometric center of the connecting portion 121 may be used as the center of the connecting portion 121.

It should be noted that the first vertical section 131 being spaced apart from one of the first baluns 122 refers to the presence of an intermediate object between the first vertical section 131 and the one of the first baluns 122, or the intermediate object is absent, which is not limited herein. Similarly, the second vertical section 141 being spaced from one of the second baluns 123 refers to an intermediate object between the second vertical section 141 and the one of the second baluns 123, or the intermediate object is absent, which is not limited herein.

Specifically, both the first feeder 130 and the second feeder 140 are, for example, feeding plates or feeding rods.

Referring to FIG. 1, in some embodiments, the first feeder 130 further includes a first transverse section 132. One end of the first transverse section 132 is connected to the first vertical section 131. The top end of each of the two first baluns 122 is provided with a first groove 1221 corresponding to the first transverse sections 132, the first transverse section 132 is provided in the first groove 1221, and an insulating spacer (not shown) is provided between the first transverse section 132 and an inner wall of the first groove 1221. In addition, the second feeder 140 further includes a second transverse section 142, one end of the second transverse section 142 is connected to the second vertical section 141, the top end of each of the two second baluns 123 is provided with a second groove 1231 corresponding to the second transverse section 142, the second transverse section

142 is provided in the second groove 1231, and an insulating spacer (not shown) is provided between the second transverse section 142 and an inner wall of the second groove 1231. In this way, the first transverse section 132 is arranged in the first groove 1221, and is spaced apart from the two first radiating plates 111, so as to be coupled to the two first radiating plates 111 and be responsible for the transmission of signals in one of polarization directions. The second transverse section 142 is arranged in the second groove 1231 and is spaced apart from the two second radiating plates 112, so as to be coupled to the two second radiating plates 112 and be responsible for the transmission of signals in the other polarization direction. In addition, the first transverse section 132 is connected to the inner wall of the first groove 1221 through the insulating spacer, so that the first feeder 130 can be stably arranged on the oscillator base 120. Similarly, the second transverse section 142 is connected to the inner wall of the second groove 1231 through the insulating spacer, so that the second feeder 140 can be stably arranged on the oscillator base 120.

It should be noted that the insulating spacer is made of an insulating material such as a plastic member, a ceramic member, a rubber member, etc., which can prevent the first transverse section 132 of the first feeder 130 from being electrically connected to the top end of the first balun 122, and also serve to fix the first feeder 130. Similarly, the second transverse section 142 of the second feeder 140 is prevented from being electrically connected to the top end of the second balun 123 while fixing the second feeder 140.

Figure 7:
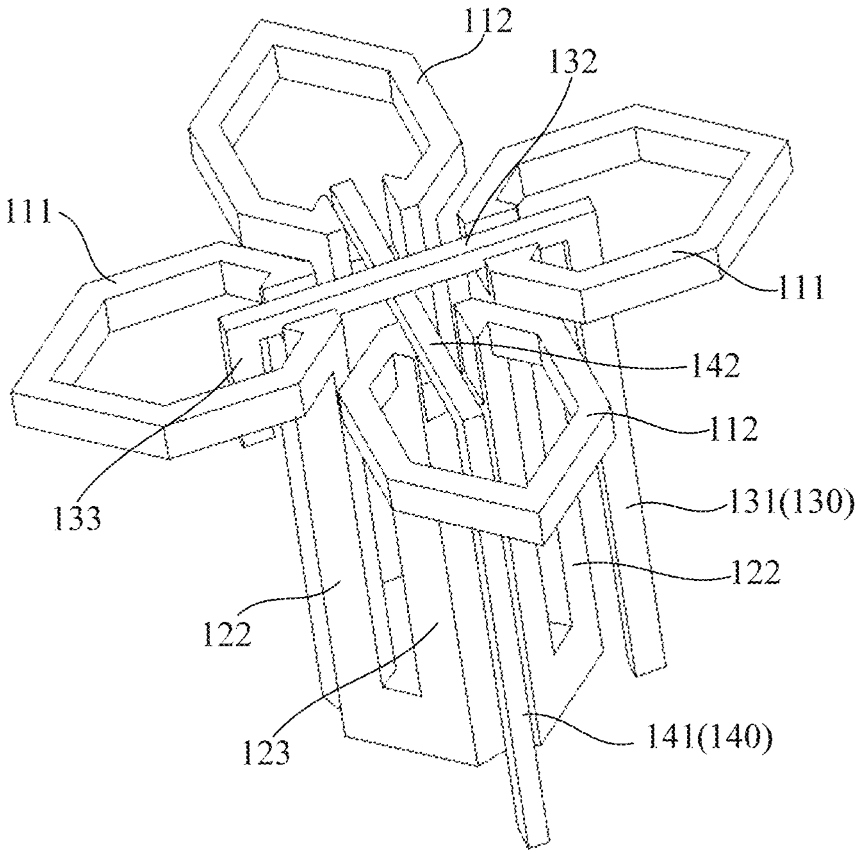
FIG. 7 is a perspective view of a high-frequency radiating unit according to yet another embodiment.
Figure 8:
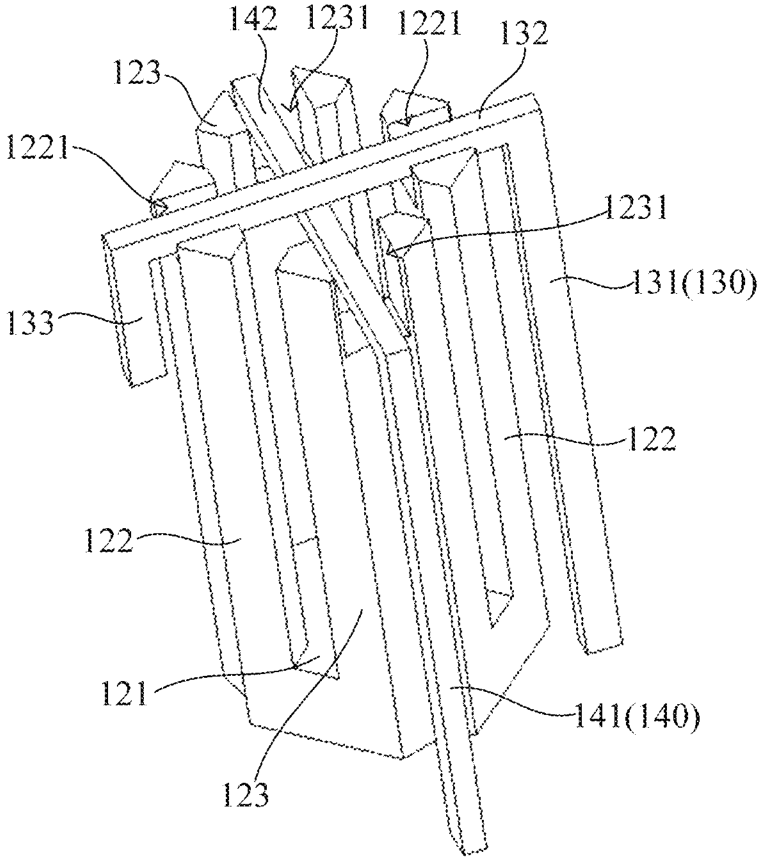
FIG. 8 is a perspective view of an oscillator base and a feeder according to an embodiment of the present disclosure.

Referring to FIG. 7 and FIG. 8, FIG. 7 is a perspective view of a high-frequency radiating unit 100 according to yet another embodiment, and FIG. 8 is a perspective view of the oscillator base 120 and the feeder according to an embodiment of the present disclosure. In some embodiments, the first feeder 130 further includes a third vertical section 133 connected to the other end of the first transverse section 132. The third vertical section 133 is provided at the periphery of the oscillator base 120. Specifically, the third vertical section 133 is spaced apart from the other first balun 122, and a distance between the third vertical section 133 and the center line O is greater than the distance between the first balun 122 and the center line O. In addition, the second feeder 140 further includes a fourth vertical section (not shown) connected to the other end of the second transverse section 142. The fourth vertical section is provided at the periphery of the oscillator base 120. Specifically, the fourth vertical section is spaced apart from the other second balun 123, and a distance between the fourth vertical section and the center line O is greater than the distance between the second balun 123 and the center line O. In this way, since the distance between the third vertical section 133 and the center line O is greater than the distance between the first balun 122 and the center line O, and the distance between the fourth vertical section and the center line O is greater than the distance between the second balun 123 and the center line O, that is, the third vertical section 133 is arranged on the side of the first balun 122 away from the center line O, and the fourth vertical section is arranged on the side of the second balun 123 away from the center line O. Such configuration is different from the prior art that the first vertical section 131 and the second vertical section 141 are arranged in internal wiring grooves of the first balun 122 and the second balun 123, so that it is not necessary to provide a closed balun structure as in the prior art, but it can provide as an opened balun structure, which can reduce the structural size of the oscillator base 120 to a certain extent, thus achieving the miniaturization of the oscillator base 120. Meanwhile, the high-frequency parasitic radiation of the balun can be reduced, and the gain of the high-frequency radiating unit 100 can be effectively improved.

Referring to FIG. 1 and FIG. 4, in some embodiments, the oscillator base 120 further includes a first sleeve 124 and a second sleeve 125 that are connected to the connecting portion 121. The first sleeve 124 is provided corresponding to the first vertical section 131. The first vertical section 131 extends through the first sleeve 124, and the first vertical section 131 and the first sleeve 124 are configured to be connected to an inner conductor and an outer conductor of one coaxial line, respectively. In addition, the second sleeve 125 is provided corresponding to the second vertical section 141. The second vertical section 141 extends through the second sleeve 125, and the second vertical section 141 and the second sleeve 125 are configured to be connected to an inner conductor and an outer conductor of another coaxial line, respectively. In this way, after the first vertical section 131 and the first sleeve 124 are connected to one of the coaxial lines, signals in one of the polarization directions are transmitted, and after the second vertical section 141 and the second sleeve 125 are connected to the other coaxial line, signals in the other polarization direction are transmitted.

Specifically, the first vertical section 131 is welded to the inner conductor of one of the coaxial lines, and the first sleeve 124 is welded to the outer conductor of one of the coaxial lines. The second vertical section 141 is welded to the inner conductor of the other coaxial line, and the second sleeve 125 is welded to the outer conductor of the other coaxial line.

Referring to FIG. 7 and FIG. 8, as an optional solution, the first sleeve 124 and the second sleeve 125 can be omitted, and the bottom ends of the first vertical section 131 and the second vertical section 141 may be directly connected (i.e., by welding) to transmission lines such as a microstrip line and a stripline. That is, optionally, the first vertical section 131 is configured to be electrically connected to a transmission line transmitting signals in one of the polarization directions, and the second vertical section 141 is configured to electrically connected to a transmission line for transmitting signals in the other polarization direction.

Referring to FIG. 2, in some embodiments, a portion of the connecting portion 121 facing the first sleeve 124 is provided with a first concave surface 1211, and the first sleeve 124 is fixed on the first concave surface 1211. A portion of the connecting portion 121 facing the second sleeve 125 is provided with a second concave surface 1212, and the second sleeve 125 is fixed on the second concave surface 1212.

Specifically, the first concave surface 1211 is an arc-shaped concave surface, and the first sleeve 124 is a sleeve having a circular cross-section. An outer wall surface of the first sleeve 124 is adapted to the first concave surface 1211, so as to be stably arranged on the first concave surface 1211. In addition, the second concave surface 1212 is similarly arranged and is not described herein again.

It should be noted that the radiator 110 and the oscillator base 120 are integrally formed by casting, so that the number of welding spots can be reduced, the production efficiency can be improved, and the product quality can be ensured. Certainly, they can also be connected by welding.

Figure 5:
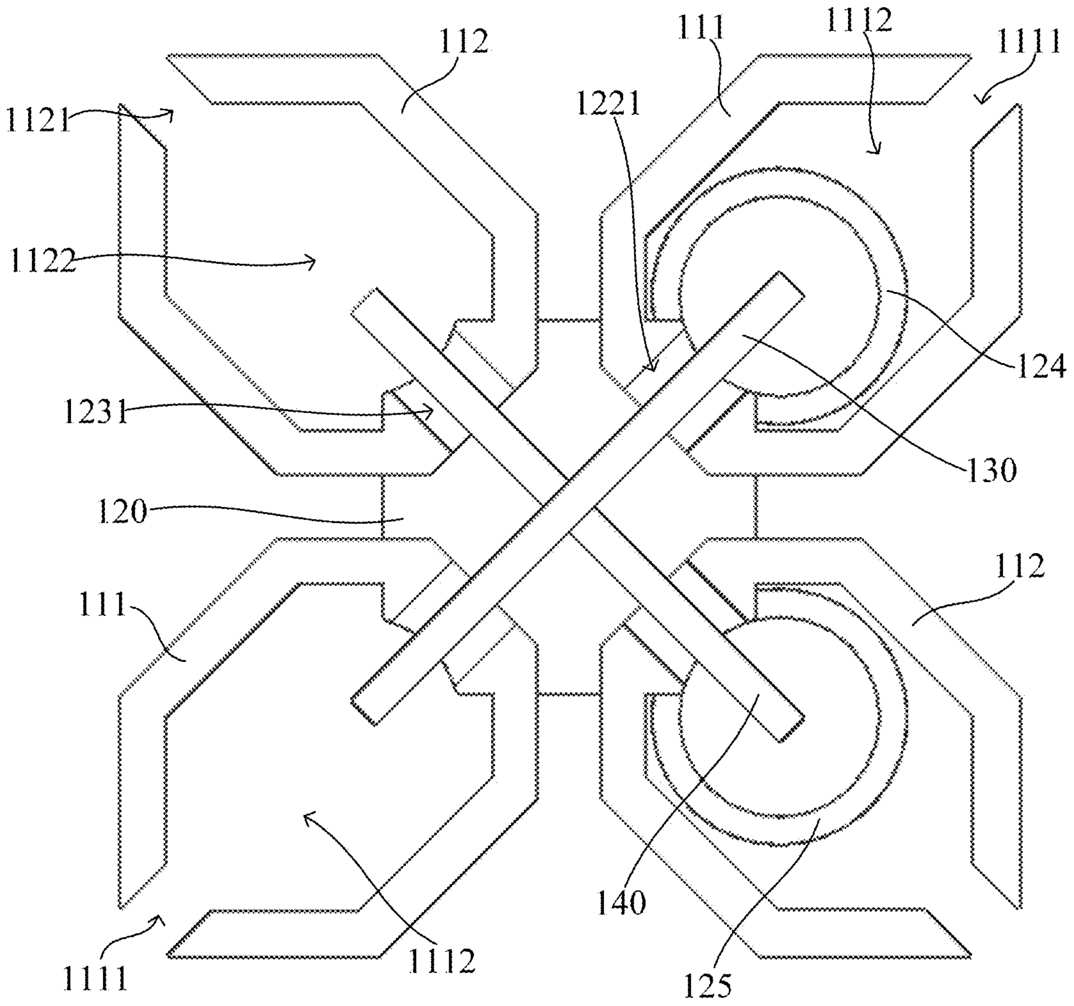
FIG. 5 is a top view of a high-frequency radiating unit according to another embodiment.
Figure 6:
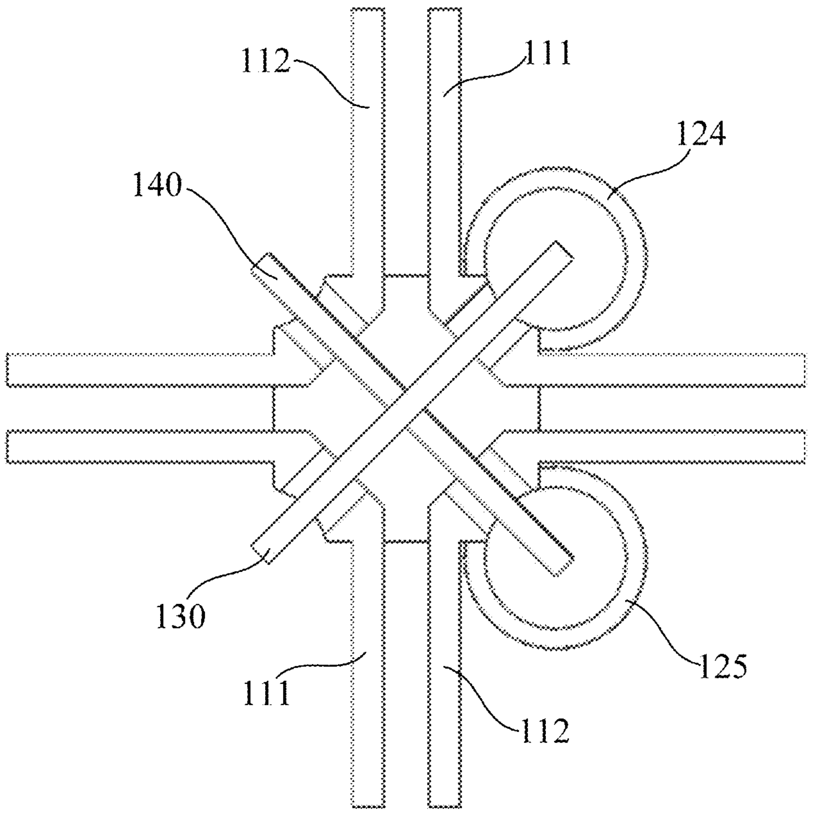
FIG. 6 is a top view of a high-frequency radiating unit according to yet another embodiment.

Referring to FIG. 2, FIG. 5 and FIG. 6, FIG. 5 is a top view of a high-frequency radiating unit 100 according to another embodiment, and FIG. 6 is a top view of a high-frequency radiating unit 100 according to yet another embodiment. In some embodiments, the first radiating plate 111 is a first frame, and the first frame is a closed frame (as shown in FIG. 2). Alternatively, the first frame is provided with a first notch 1111 (as shown in FIG. 5 or FIG. 6) at a portion away from the first balun 122. The second radiating plate 112 is a second frame, and the second frame is a closed frame (as shown in FIG. 2). Alternatively, the second frame is provided with a second notch 1121 (as shown in FIG. 5 or FIG. 6) at a portion away from the second balun 123.

Referring to FIG. 2, FIG. 5 and FIG. 6, it should be noted that the first frame specifically refers to a frame in which a first hollow area 1112 is provided in a middle area of the surface of the first radiating plate 111. Similarly, the second frame specifically refers to a frame in which a second hollow area 1122 provided in a middle area of the surface of the second radiating plate 112.

Referring to FIG. 2, FIG. 5 and FIG. 6, it should be noted that the first frame may be either a closed frame or a non-closed frame. When the first frame is a non-closed frame, for example, the first notch 1111 is provided at a portion of the first frame away from the first balun 122. Alternatively, for example, the first frame includes two first radiating edges connected to the first balun 122. Similarly, the second frame may be either a closed frame or a non-closed frame. When the second frame is a non-closed frame, for example, a second notch 1121 is provided at a portion of the second frame away from the second balun 123. Alternatively, for example, the second frame includes two second radiating edges connected to the second balun 123. In addition, the specific shape of the first frame and the specific shape of the second frame are not limited herein and may be set according to actual requirements.

Figure 9:
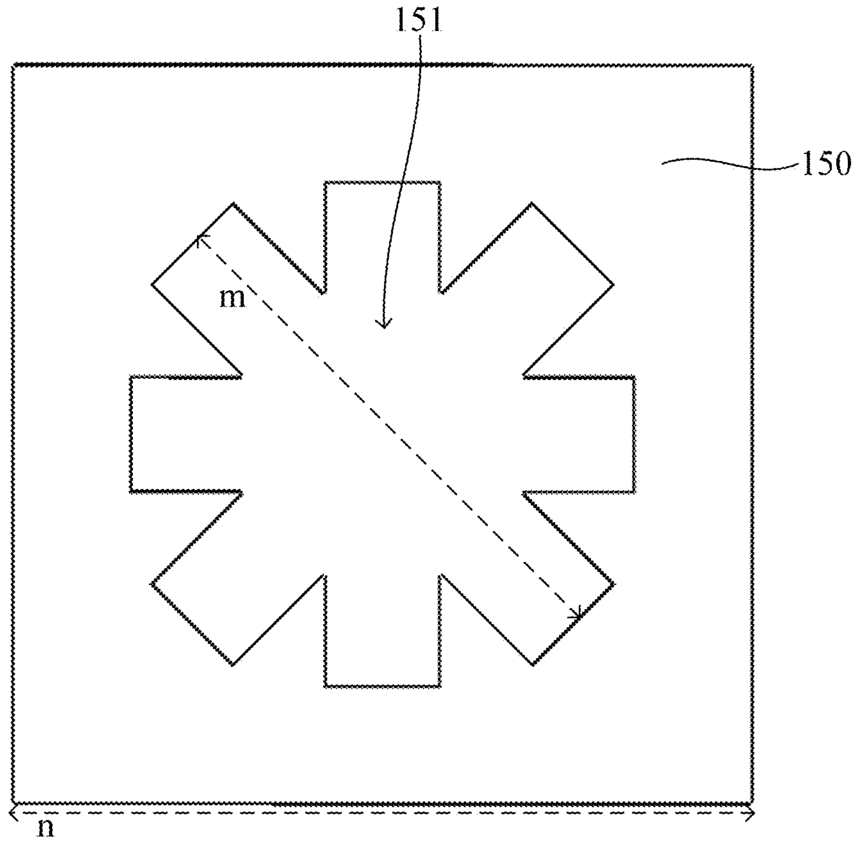
FIG. 9 is a top view of a coupling metal plate according to an embodiment of the present disclosure.
Figure 10:
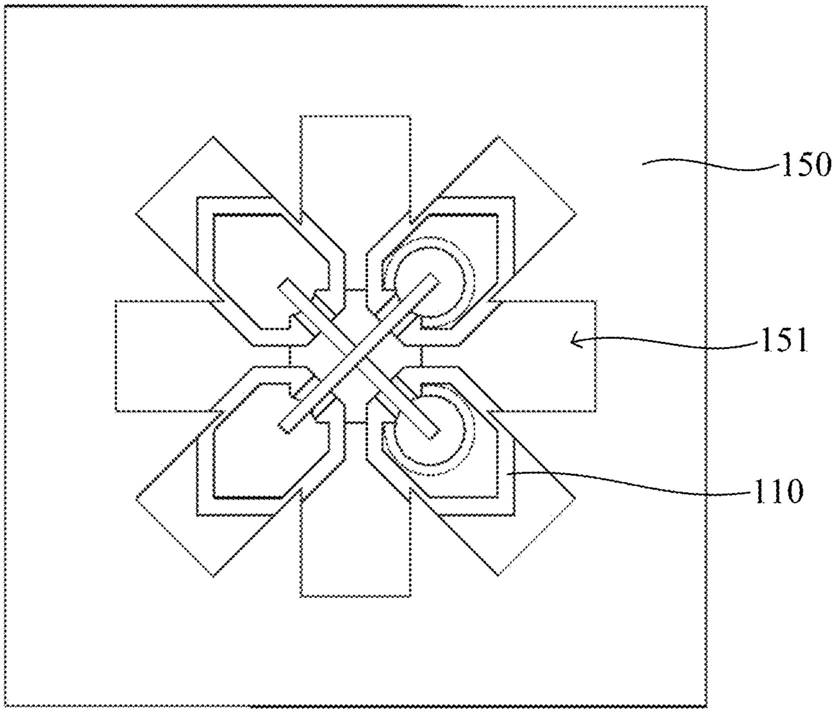
FIG. 10 is a top view of a high-frequency radiating unit according to an embodiment of the present disclosure.

Referring to FIG. 9 and FIG. 10, FIG. 9 is a top view of a coupling metal plate 150 according to an embodiment of the present disclosure, and FIG. 10 is a top view of a high-frequency radiating unit 100 according to an embodiment of the present disclosure. In some embodiments, the high-frequency radiating unit 100 further includes a coupling metal plate 150. The coupling metal plate 150 is provided above the radiator 110 at an interval, and a surface of the coupling metal plate 150 is provided with a hollow-out opening 151. The hollow-out opening 151 is shaped as "+" or "*". In this way, the coupling metal plate 150 provided above the radiator 110 can effectively reduce a height and an aperture size of the radiator 110 while realizing the wideband impedance matching of the high-frequency radiating unit 100, thereby reducing the low-frequency parasitic radiation of the radiator 110. In addition, the coupling between the coupling metal plate 150 and the radiator 110 has a high-pass filtering feature, which can effectively suppress a coupling signal of the low-frequency radiating unit 200, thereby reducing the low-frequency parasitic radiation of the high-frequency radiating unit 100, and effectively improving the low-frequency antenna gain in the multi-frequency base station antenna.

In addition, since the high-frequency radiating unit 100 has a higher gain than a conventional high-frequency radiating unit, and has a good performance of suppressing low-frequency parasitic radiation, a distance between the high-frequency radiating unit 100 and the low-frequency radiating unit 200 can be effectively reduced while ensuring antenna performance, the antenna array layout is more compact, and the miniaturization and high performance of the antenna can be achieved. In addition, the high-frequency radiating unit 100 has a simple structure, is easy to be integrally formed, and has the advantages of miniaturization, low cost, light weight, few welding spots, etc.

Referring to FIGS. 9 and 10, in some embodiments, the coupling metal plate 150 is a square plate. A length of the diagonal line of the hollow-out opening 151 is defined as m, and m is 0.25 to 0.4 times of a wavelength of a center operating frequency. A length of any side of the coupling metal plate 150 is defined as n, and n is 0.35 to 0.55 times of the wavelength of the center operating frequency.

It should be noted that, in this embodiment, the operating frequency band is, for example, 1427 MHz to 2690 MHz, and a relative bandwidth is about 61.4%.

Further, the coupling metal plate 150 is fixed above the radiator 110 through an insulating spacer. Specifically, a distance between the coupling metal plate 150 and an upper surface of the radiator 110 is defined as S, and S is less than 0.05 times of the wavelength of the center operating frequency.

Referring to FIGS. 2 and 3, in some embodiments, the aperture sizes of the first dipole and the second dipole are defined as L, and L is 0.2 to 0.35 times of the wavelength of the center operating frequency. A distance from a surface of the radiator 110 to a bottom surface of the connecting portion 121 is defined as H, and H is 0.14 to 0.2 times of the wavelength of the center operating frequency.

In this way, by configuring size parameters of the high-frequency radiating unit 100 and the coupling metal plate 150, the wideband impedance matching of the high-frequency radiating unit 100 can be realized, the working bandwidth with the voltage standing wave ratio less than 1.4 can reach 62%, and the coupling signal with the low frequency can be effectively suppressed.

As an optional solution, the coupling metal plate 150 may be omitted. When the coupling metal plate 150 above the radiator 110 is removed, L is, for example, 0.5 times of the wavelength of the center operating frequency, and H is, for example, 0.25 times of the wavelength of the center operating frequency.

Figure 11:
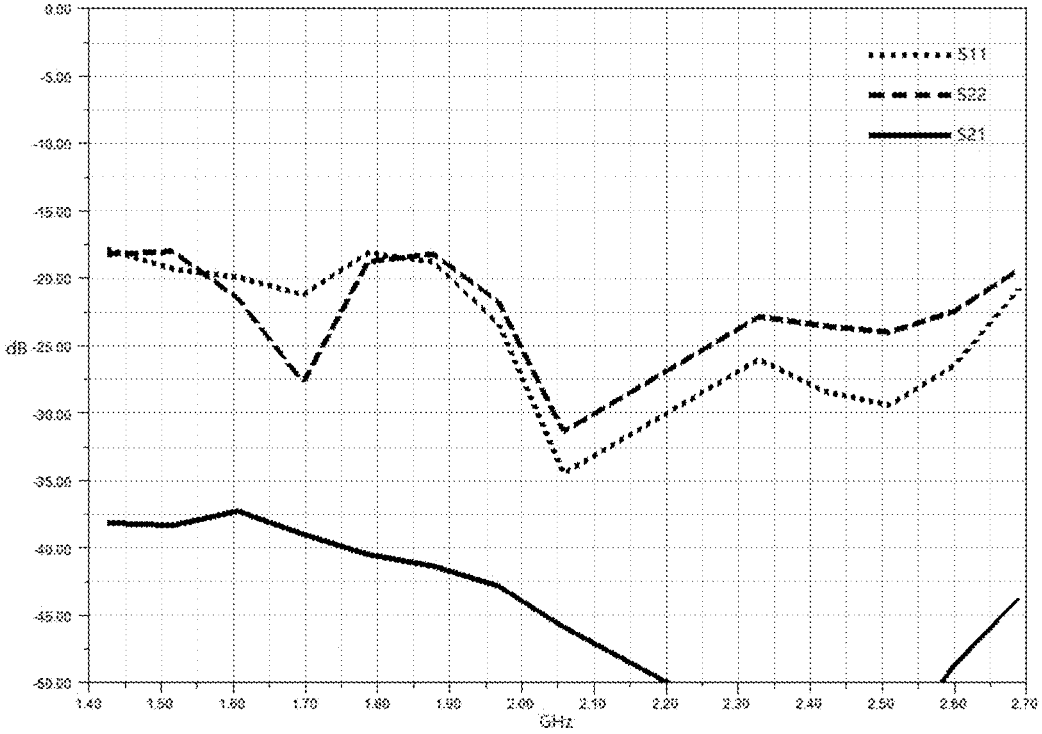
FIG. 11 is a simulation S-parameter curve diagram of a high-frequency radiating unit according to an embodiment of the present disclosure.
Figure 12:
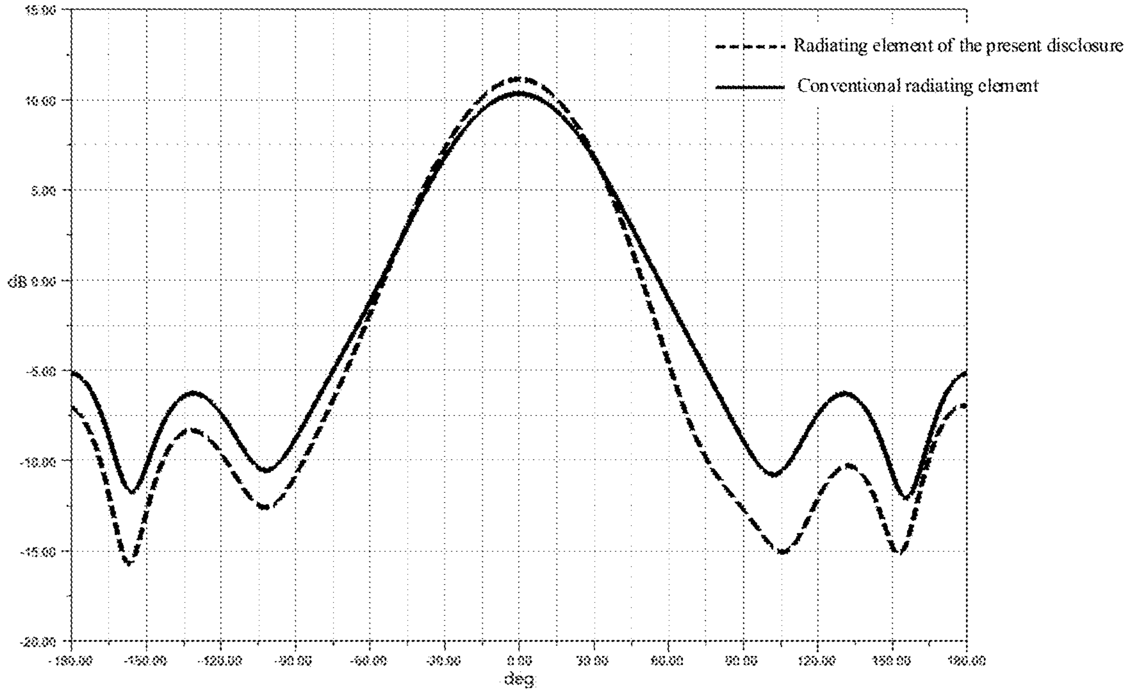
FIG. 12 is a comparison diagram of simulation directivity coefficients of a high-frequency radiating unit provided by an embodiment of the present disclosure and a high-frequency radiating unit of a conventional balun structure when an operating frequency is 2.6 GHz.

Referring to FIGS. 11 and 12, FIG. 11 is a simulation S-parameter curve diagram of the high-frequency radiating unit 100 according to an embodiment of the present disclosure, and FIG. 12 is a comparison diagram of simulation directivity coefficients of a high-frequency radiating unit 100 provided by an embodiment of the present disclosure and a high-frequency radiating unit 100 of a conventional balun structure when an operating frequency is 2.6 GHz. In FIG. 11, S11 refers to a reflection coefficient of one of the polarizations, S22 refers to a reflection coefficient of the other polarization, and S21 refers to an isolation between the two polarizations. It can be seen from FIG. 11 that the high-frequency radiating unit 100 in this embodiment has good ultra-wideband characteristics. It can be seen from FIG. 12 that the high-frequency radiating unit 100 in this embodiment has a narrower beam width and a higher directivity coefficient compared with the conventional high-frequency radiating unit, and the radiation performance is improved.

Figure 13:
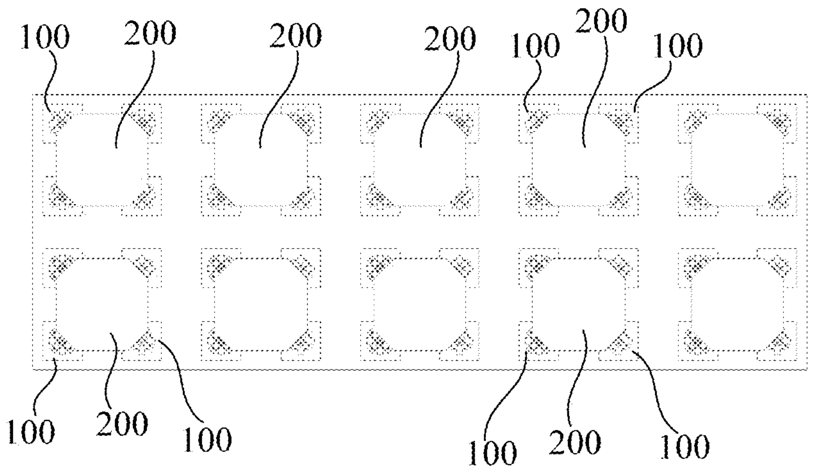
FIG. 13 is a top view of a multi-frequency base station antenna according to an embodiment of the present disclosure.

Referring to FIG. 13, FIG. 13 is a top view of a multi-frequency base station antenna according to an embodiment of the present disclosure. In an embodiment, a multi-frequency base station antenna includes at least one high-frequency radiating unit 100 according to any one of the above embodiments, and further includes a reflecting plate (not shown) and at least one low-frequency radiating unit 200. Both the high-frequency radiating unit 100 and the low-frequency radiating unit 200 are provided on the reflecting plate.

Specifically, the connecting portion 121 is provided on a surface of the reflecting plate, the first sleeve 124 and the second sleeve 125 extend through the reflecting plate and are connected to the coaxial line. The first sleeve 124 and the second sleeve 125 are also fixed on the reflecting plate.

According to the aforementioned multi-frequency base station antenna, since the distance between the first vertical section 131 and the center line O is greater than the distance between the first balun 122 and the center line O, and the distance between the second vertical section 141 and the center line O is greater than the distance between the second balun 123 and the center line O, that is, the first vertical section 131 is arranged on a side of the first balun 122 away from the center line O, and the second vertical section 141 is arranged on a side of the second balun 123 away from the center line O. Such configuration is different from the prior art that the first vertical section 131 and the second vertical section 141 are arranged in internal wiring grooves of the first balun 122 and the second balun 123, so that it is not necessary to provide a closed balun structure as in the prior art, but it can provide as an opened balun structure, which can reduce the structural size of the oscillator base 120 to a certain extent, thus achieving the miniaturization of the oscillator base 120. Meanwhile, the high-frequency parasitic radiation of the balun can be reduced, and the gain of the high-frequency radiating unit 100 can be effectively improved. Further, the coupling metal plate 150 provided above the radiator 110 can effectively reduce a height and the aperture size of the radiator 110 while realizing the wideband impedance matching of the high-frequency radiating unit 100, thereby reducing the low-frequency parasitic radiation of the radiator 110. In addition, the coupling between the coupling metal plate 150 and the radiator 110 has a high-pass filtering feature, which can effectively suppress a coupling signal of the low-frequency radiating unit 200, thereby reducing the low-frequency parasitic radiation of the high-frequency radiating unit 100, and effectively improving the low-frequency antenna gain in the multi-frequency base station antenna.

It should be noted that the first balun 122 and the second balun 123 may be interpreted as a part of the connecting portion 121, that is, the first balun 122 and the second balun 123 and other parts of the connecting portion 121 are integrally formed, or can also be separated from the other parts of the connecting portion 121, that is, a first protruding body can be manufactured independently, and then combined with the other parts of the connecting portion 121 as a whole. As shown in FIG. 1, in an embodiment, the first balun 122 and the second balun 123 are a part of the connecting portion 121 that is integrally formed.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential direction" are based on the azimuth or position relationship shown in the attached drawings, which are only for the convenience of describing the present disclosure and simplifying the description, rather than indicating or implying that the device or element must have a specific azimuth, be constructed and operated in a specific azimuth, so such terms cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "a plurality of" means at least two, such as two, three, etc., unless otherwise expressly and specifically defined.

In the present disclosure, unless otherwise expressly specified and limited, the terms "mount", "connect", "contact", "fix" and other terms should be understood in a broad sense, for example, they can be fixed connections, detachable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

What is claimed is:

1. A high-frequency radiating unit, comprising:

a radiator comprising a first dipole and a second dipole that are arranged orthogonally, the first dipole comprising two first radiating plates, and the second dipole comprising two second radiating plates;

an oscillator base comprising a connecting portion, two first baluns, and two second baluns, wherein bottom ends of the two first baluns and the two second baluns are connected to the connecting portion, top ends of the two first baluns are connected to the two first radiating plates in one-to-one correspondence, top ends of the two second baluns are connected to the two second radiating plates in one-to-one correspondence, and a straight line passing through a center of the connecting portion and perpendicular to a surface of each of the two first radiating plates and the two second radiating plates is defined as a center line; and a first feeder and a second feeder that are arranged orthogonally, wherein the first feeder is electrically connected to the first dipole, the second feeder is electrically connected to the second dipole, the first feeder comprises a first vertical section arranged at a periphery of the oscillator base, a distance between the first vertical section and the center line is greater than a distance between each first balun of the two first baluns and the center line, the second feeder comprises a second vertical section arranged at the periphery of the oscillator base, and a distance between the second vertical section and the center line is greater than a distance between each second balun of the two second baluns and the center line.

2. The high-frequency radiating unit according to claim 1, wherein the first feeder further comprises a first transverse section, an end of the first transverse section is connected to the first vertical section, the top end of each of the two first baluns is provided with a first groove corresponding to the first transverse section, the first transverse section is provided in the first groove, an insulating spacer is provided between the first transverse section and an inner wall of the first groove, the second feeder further comprises a second transverse section, an end of the second transverse section is connected to the second vertical section, the top end of each of the two second baluns is provided with a second groove corresponding to the second transverse section, the second transverse section is provided in the second groove, and an insulating spacer is provided between the second transverse section and an inner wall of the second groove.

3. The high-frequency radiating unit according to claim 2, wherein the first feeder further comprises a third vertical section connected to another end of the first transverse section, the third vertical section is provided at the periphery of the oscillator base, a distance between the third vertical section and the center line is greater than the distance between the first balun and the center line, the second feeder further comprises a fourth vertical section connected to another end of the second transverse section, the fourth vertical section is provided at the periphery of the oscillator base, and a distance between the fourth vertical section and the center line is greater than the distance between the second balun and the center line.

4. The high-frequency radiating unit according to claim 1, wherein the oscillator base further comprises a first sleeve and a second sleeve that are connected to the connecting portion, the first sleeve is provided corresponding to the first vertical section, the first vertical section extends through the first sleeve, the first vertical section and the first sleeve are configured to be connected to an inner conductor and an outer conductor of one coaxial line, respectively, the second sleeve is provided corresponding to the second vertical section, the second vertical section extends through the second sleeve, and the second vertical section and the second sleeve are configured to be connected to an inner conductor and an outer conductor of another coaxial line, respectively.

5. The high-frequency radiating unit according to claim 4, wherein a portion of the connecting portion facing the first sleeve is provided with a first concave surface, the first sleeve is fixed on the first concave surface, a portion of the connecting portion facing the second sleeve is provided with a second concave surface, and the second sleeve is fixed on the second concave surface.

6. The high-frequency radiating unit according to claim 1, wherein the first vertical section is configured to be electrically connected to a transmission line for transmitting signals in one of the polarization directions, and the second vertical section is configured to be electrically connected to a transmission line for transmitting signals in another polarization direction.

7. The high-frequency radiating unit according to claim 1, wherein:

each first radiating plate of the two first radiating plates is a first frame, the first frame is a closed frame, or the first frame is provided with a first notch at a portion away from the corresponding first balun; and each second radiating plate of the two second radiating plates is a second frame, the second frame is a closed frame, or the second frame is provided with a second notch at a portion away from the corresponding second balun.

8. The high-frequency radiating unit according to claim 1, further comprising a coupling metal plate provided above the radiator at an interval, wherein a surface of the coupling metal plate is provided with a hollow-out opening, and the hollow-out opening is shaped as a plus sign or an asterisk.

9. The high-frequency radiating unit according to claim 8, wherein the coupling metal plate is a square plate, a length of a diagonal line of the hollow-out opening is defined as m, m is 0.25 to 0.4 times of a wavelength of a center operating frequency, a length of any side of the coupling metal plate is defined as n, and n is 0.35 to 0.55 times of the wavelength of the center operating frequency.

10. The high-frequency radiating unit according to claim 8, wherein aperture sizes of the first dipole and the second dipole are defined as L, L is 0.2 to 0.35 times of the wavelength of the center operating frequency, a distance from a surface of the radiator to a bottom surface of the connecting portion is defined as H, and H is 0.14 to 0.2 times of the wavelength of the center operating frequency.

11. A multi-frequency base station antenna, comprising at least one high-frequency radiating unit according to claim 1, a reflecting plate, and at least one low-frequency radiating unit, wherein both the high-frequency radiating unit and the low-frequency radiating unit are provided on the reflecting plate.

* * * * *